June 17, 1952 — E. W. HILL — 2,601,139
BALL COCK
Filed Jan. 25, 1949
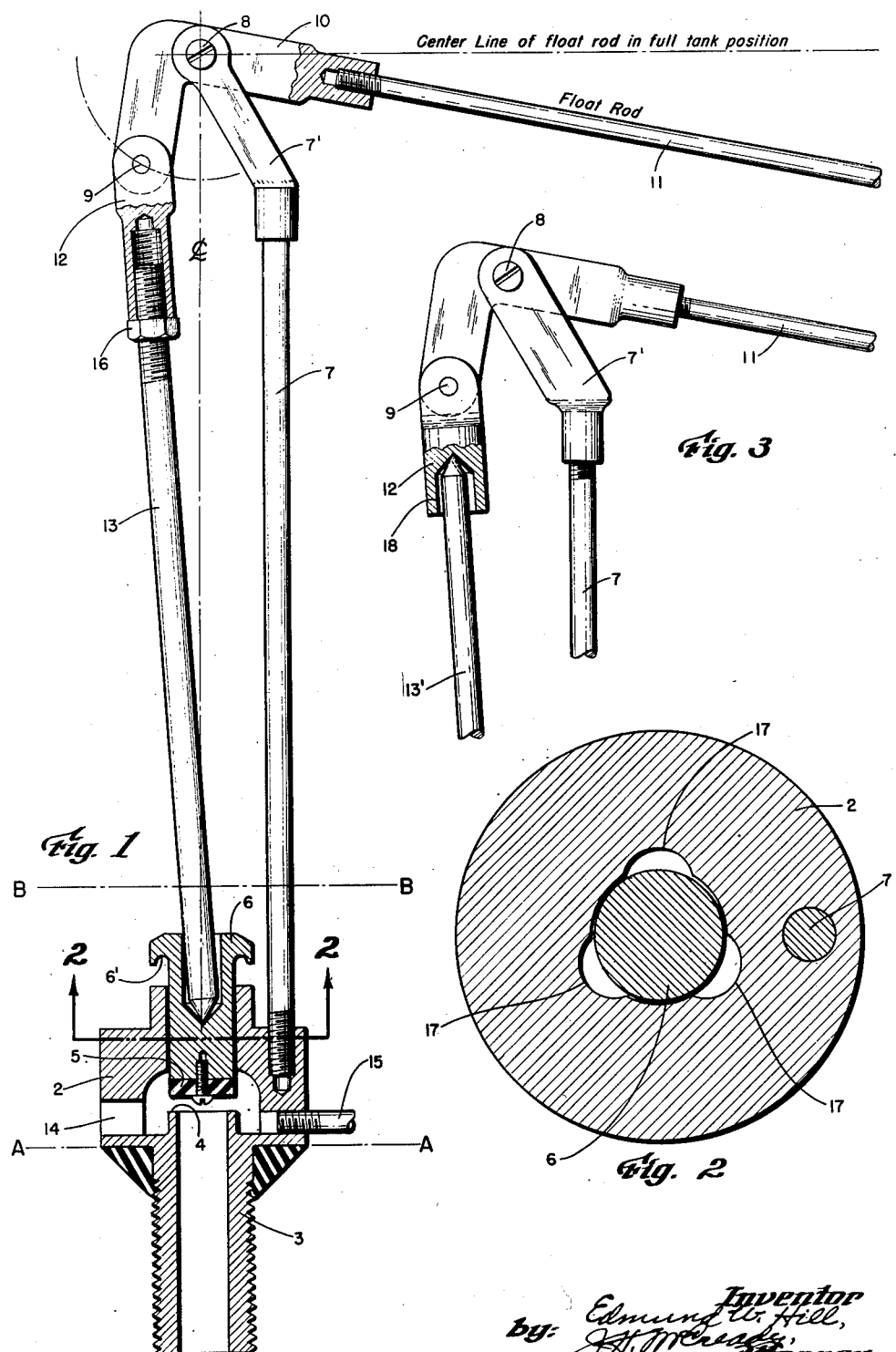
Inventor
Edmund W. Hill,
by: J. H. McCrady,
Attorney.

Patented June 17, 1952

2,601,139

UNITED STATES PATENT OFFICE 2,601,139

BALL COCK

Edmund W. Hill, Belgrade Lakes, Maine

Application January 25, 1949, Serial No. 72,633

5 Claims. (Cl. 137—445)

This invention relates to the apparatus used in water closets to control automatically the filling of the tank. Such apparatus is ordinarily referred to as a "ball cock."

While devices of this character have been in use for many years, they still are the subject of much criticism. Among the complaints more commonly heard may be mentioned the fact that they are unduly complicated and, consequently, are necessarily expensive; are unreliable in operation; and are liable to cause trouble when used in places where wide variations of pressure in the water supply system occur. If the pressure is high, it is common to have leakage occur around the valve which controls the admission of water to the tank. In order to minimize this difficulty when the supply pressure is high, it is often necessary to use a pressure reducing valve of some type to lower the pressure at the ball cock to a value that will give reasonably satisfactory operation.

When wear occurs in the control valve trouble often is experienced with the spraying of water around it. This may be due either to wear of the valve itself or to wear in the packing around the valve stem. Also, in any of these devices, it is expected that it will be necessary to renew the washer which bears on the valve seat at fairly frequent intervals, and such renewal usually requires the attention of a plumber. Quietness of operation is a characteristic much sought in devices of this kind, but very few of them meet this requirement.

The present invention is especially concerned with the considerations above mentioned, and it aims to devise a construction in which not only will these objectionable features of operation be eliminated, or at least minimized, but which also can be manufactured more economically than the prior art constructions.

The nature of the invention will be readily understood from the following description when read in connection with the accompanying drawings, and the novel features will be particularly pointed out in the appended claims.

In the drawings,

Fig. 1 is a mainly a side elevation, with some parts in section, illustrating a ball cock manufactured in accordance with the present invention;

Fig. 2 is a sectional view on the line 2—2, Fig. 1; and

Fig. 3 is a view, mainly in side elevation, showing a modification.

Referring first to Fig. 1, the construction there shown comprises a valve body or fitting 2 designed to be mounted in the bottom of a water closet tank and is provided with a screw-threaded nipple 3 for connection to the water supply system. The bore of this fitting terminates at a valve seat 4, and cooperating with this seat is a washer 5 removably mounted on the lower end of a plunger 6. This plunger is slidable freely in the fitting 2 so that it can be lifted out whenever necessary and replaced by sliding it back into the valve body 2 again.

As is usual in devices of this character, the valve is operated by connections with a ball float, and according to this invention these connections are supported on an upright rod 7 provided at its upper end with a fulcrum piece 7' carrying a pivot pin or screw 8 on which the lever 10 is fulcrumed. The float rod 11 is screwed into one arm of this lever, while the other arm has an internally screw-threaded link or yoke 12 pivoted to it to receive the upper end of the compression rod 13, the lower end of which extends loosely into a tapered socket in the plunger 6.

With this arrangement it will readily be seen that when the float arm is in a position such as that shown in Fig. 1, the plunger 6 will be in an intermediate position. Water at that time will be flowing in through the nipple 3, out through the port 14 and into the tank. Also, water will flow through the refill tube 15 which usually discharges into the overflow pipe in the tank. As the tank continues to fill, the float rises and the plunger 6 is pushed downwardly until finally it is forced against the seat 4 with sufficient pressure to shut off the inflow of water. When the flush valve or dump valve is opened, the water in the tank flows rapidly out of it, whereupon the float descends, thus pulling the compression rod 13 upwardly and allowing the water pressure against the lower face of the washer 5 to lift the plunger 6 and open the valve.

In these respects the device operates in somewhat the same manner that any commercial ball cock is supported to operate. There are, however, several important features of difference. It should be observed that in this construction the supply valve 2 which controls the flow of water into the tank is located in the bottom of the tank where it is always submerged. This will be clear from an inspection of Fig. 2 in which the dotted line A—A indicates the inner bottom surface of the tank and B—B shows a typical low water level. The valve body is integral with the nipple by which the tank is connected with the water supply system. Because of its position, any leakage which may occur around the valve is under water and causes neither objectionable noise nor spray.

Referring to the upper part of Fig. 1, it will be observed that as the lever 10 swings about its fulcrum screw 8 while the tank fills, and as the float consequently rises to its full tank position, the pivot 9 swings downwardly along the arc indicated by the dotted line toward the center line CL connecting the axis of the pivot 8 with that of the valve plunger 6. In this relationship the pivot 9 acts as the center pivot of a toggle, the end pivots of which are at 8 and at the lower tip end of the compression rod 13. Consequently, the force exerted by the float operating through this middle pivot exerts a powerful downward pressure on the plunger 6 and that pressure increases as the pivot 9 approaches the center line CL. In other words, as the pivot 9 approaches the center line the toggle approaches its fully straightened position where it exerts its maximum valve closing pressure, while as it moves away from that line it becomes more and more collapsed or "broken." The pressure so created is useful in closing the valve 6 with certainty, even when the pressure in the water supply system is unusually high. Thus the necessity for using a pressure regulating valve in order to accommodate wide variations in pressure is eliminated. It should also be observed that this arrangement avoids the use of any packing around a valve stem. While the pressure on the plunger applied through the lever 10 increases slowly as the valve closes, the lever has an opening movement of sufficient amplitude to permit fast filling of the tank.

As above indicated, the valve 2 is always submerged. The high level can, of course, be adjusted by threading the rod 7 up or down in the valve fitting 2, or in the crude, but effective, manner so commonly used of bending the float rod. It is preferable, however, to have the part of the float rod adjacent to the lever 10 in a horizontal position when the tank is full.

The freedom of movement of the plunger 6 vertically in the valve body 2 contributes to ease of operation and the accurate seating of the washer 5 on the upper end of the nipple 3. Also contributing to the latter effect is the fact that the lower end of the compression rod 13 seats freely in the conical recess or socket formed in the upper end of the plunger. This construction also facilitates the replacement of the washer 5 when it becomes worn. In performing this operation the compression rod may be lifted far enough to free it from the plunger, after which the latter can be slipped upwardly out of the valve body, the washer replaced, and the parts again restored to their initial relationship.

Because of the clearance required around the plunger to permit its easy operation, some leakage will occur around it during the filling of the tank and, in fact, it is preferable either to groove the plunger, or the walls of the socket in which it slides, as indicated at 17 in Fig. 2, so as to increase the freedom of discharge of the water from the interior of the valve body into the tank. This water flowing up along the sides of the plunger strikes the reversely curved surface 6' formed in the lower side of the upper flanged head of the plunger and thus is deflected downwardly, preventing this water from being sprayed upwardly into the tank.

Fig. 1 shows the compression rod 13 threaded into the yoke 12 and locked by a check nut 16, providing an adjustment such that the valve plunger 6 can be closed at the desired point in the swing of the lever 10 and the pressure with which the plunger is seated can also be varied. For some purposes, however, it will be found preferable to provide the yoke 12 with a conical counterbored socket 18, as shown in Fig. 3, to receive the tapered tip of the upper end of the compression rod 13', the lower end being shaped as shown in Fig. 1. Or, by providing a conical counterbored socket in the end of the lever 10 for receiving the upper end of the compression rod 13' and providing an adjustment by using one right and one left-hand thread in the vertical, stationary rod 7, or by a threaded linkage in the compression rod 13'. Such a modification facilitates the inspection and repair of the plunger 6 or its washer 5 because it avoids any necessity for unscrewing the compression rod from the yoke.

A further advantage of mounting the plunger 6 in the valve body where it is freely slidable is that, in the event a negative pressure is created in the water supply line, which does happen at times, the valve is held in its seated and closed position, partly by virtue of its own weight, plus that of the water in the tank, but more especially because of the suction in the supply line. This avoids draining of the tank into the supply line when there is negative pressure therein, thus inherently providing an antisyphon feature.

From the foregoing it will be evident that the invention provides a ball cock of an exceptionally simple construction which, in addition to the advantages above described, has the virtue of being very economical to manufacture, easy to maintain, and exceptionally reliable in operation.

While I have herein shown and described a typical embodiment of my invention, it will be understood that the invention may be embodied in other forms without departing from the spirit or scope thereof.

Having thus described my invention, what I desire to claim as new is:

1. A ball cock for use in water closets comprising a valve fitting having a water inlet and a valve seat surrounding said inlet, a valve plunger slidable in said fitting in to and out of closing relation to said seat, a rod loosely engaged at its lower end with the plunger, means for operating said plunger and rod comprising a float operated lever and a pivoted element cooperating with said lever and said rod to form a toggle mechanism operable to seat said plunger when the toggle is substantially straightened, said pivoted element being movable with said float operated lever and provided with a socket to receive loosely the upper end of said rod.

2. A ball cock for use in water closets comprising a valve fitting having a water inlet and a valve seat surrounding said inlet, a valve plunger slidable in said fitting in to and out of closing relation to said seat, and means for operating said plunger comprising a float operated lever, a rod mounted on said valve fitting and having a fulcrum piece at its end opposite said fitting supporting the fulcrum for said lever, an operating rod for said plunger, said plunger having a conical socket in its upper end, a yoke pivoted to said lever and having a conical socket in its end adjacent to said rod, said rod having its opposite ends tapered and positioned in said respective sockets.

3. A ball cock for use in water closets comprising a valve fitting having a water inlet and a valve seat surrounding said inlet, a valve plunger slidable in said fitting in to and out of closing relation to said seat, and means for operating said plunger comprising a float operated lever, a rod mounted on said valve fitting and having a fulcrum piece at its end opposite said fitting supporting the fulcrum for said lever, an operating rod for said plunger having a loose connection with the latter and a pivotal connection with said lever, the portion of said lever between its fulcrum point and its pivotal connection with said rod forming one link of a toggle and the other link being formed by said plunger operating rod, the center pivot of said toggle consisting of the pivotal connection between the lever and the operating rod, whereby the normal movements of said float operated lever carry said center pivot to and from a position closely adjacent to the line connecting the axis of said plunger with said lever fulcrum.

4. A ball cock for use in water closets comprising a valve fitting having a water inlet and a valve seat surrounding said inlet, a valve plunger slidable in said fitting in to and out of closing relation to said seat, and means for operating said plunger comprising a float operated lever, a rod mounted on said valve fitting and having a fulcrum piece at its end opposite said fitting supporting the fulcrum for said lever, an operating rod for said plunger, said plunger having a conical socket in its upper end and said lever having a conical socket in its end adjacent to said rod, said rod having its opposite ends positioned loosely in said respective sockets.

5. A ball cock for use in water closets, comprising a valve fitting secured in the bottom of the tank thereof, said fitting having a water inlet and a valve seat surrounding said inlet, a valve plunger slidable in said fitting in to and out of closing relation to said seat, a float-operated lever, a rod connecting said lever with said plunger and arranged to operate the latter in accordance with changes in the position of the float, said rod including a toggle mechanism for moving the rod in to and out of a position of vertical alignment with the axis of the valve plunger, said plunger being further provided with a socket in its upper end to receive loosely the lower end of said rod.

EDMUND W. HILL.

REFERENCES CITED

The following references are of record in the file of this patent:

UNITED STATES PATENTS

| Number | Name | Date |
| --- | --- | --- |
| 304,290 | Blessing | Sept. 2, 1884 |
| 313,951 | Renders | Mar. 17, 1885 |
| 653,233 | Heuck | Aug. 7, 1900 |
| 712,268 | Demekker | Oct. 28, 1902 |
| 732,776 | Neymeyer | July 7, 1903 |
| 943,793 | Schossow | Dec. 21, 1909 |
| 1,612,350 | Berry | Dec. 28, 1926 |
| 1,768,562 | Brooks | July 1, 1930 |